United States Patent [19]

Yoshikawa

[11] Patent Number: 5,067,745
[45] Date of Patent: Nov. 26, 1991

[54] AIR BAG IGNITION CONTROL SYSTEM FOR AUTOMOTIVE VEHICLE AND THE METHOD

[75] Inventor: Hironori Yoshikawa, Zama, Japan

[73] Assignee: Nissan Motor Co., Ltd., Yokohama, Japan

[21] Appl. No.: 586,081

[22] Filed: Sep. 21, 1990

[30] Foreign Application Priority Data

Sep. 28, 1989 [JP] Japan .................. 1-253461

[51] Int. Cl.⁵ ............................................. B60R 21/32
[52] U.S. Cl. ...................................... 280/735; 180/274; 364/424.05
[58] Field of Search ................. 240/734, 735; 180/271, 180/274; 307/10.1; 364/424.05

[56] References Cited

U.S. PATENT DOCUMENTS

| 4,958,851 | 9/1990 | Behr et al. | 280/735 |
| 4,979,763 | 12/1990 | Blackburn | 280/735 |
| 4,985,835 | 1/1991 | Sterler et al. | 280/735 |

FOREIGN PATENT DOCUMENTS

| 55-19627 | 2/1980 | Japan . |
| 55-47602 | 3/1980 | Japan . |
| 63-503531 | 12/1988 | Japan . |

*Primary Examiner*—Kenneth R. Rice
*Attorney, Agent, or Firm*—Foley & Lardner

[57] ABSTRACT

To reliably discriminate a slight collision from a serious collision or vice versa by use of only a single shock sensor, the air bag ignition control system for an automotive vehicle comprises a deceleration sensor, a low-pass filter, and a CPU provided with functions for calculating a vehicle speed information value B and a collision mode information value E both on the basis of deceleration detection signal, and an ignition decision information value F on the basis of the two calculated information values B and E. The CPU generates an air bag ignition signal when the calculated ignition decision information value F exceeds a predetermined value K. In practice, since the system can be mainly configured by low- and/or band-pass filters and a CPU, it is possible to simplify the system configuration, markedly.

13 Claims, 7 Drawing Sheets

AIR BAG IGNITION CONTROL SYSTEM FOR AUTOMOTIVE VEHICLE AND THE METHOD

BACKGROUND OF THE INVENTION

1. Field of the Invention

The present invention relates to an air bag ignition control apparatus for an automotive vehicle and the control method therefor, and more specifically to an air bag ignition control system and the method of discriminating slight collision from serious collision or vice versa by use of a single shock sensor.

2. Description of the Prior Art

The air bag expansion apparatus is used to protect a vehicle driver from shock generated when the vehicle collides against an object. In more detail, at vehicle collision, shock is detected by plural shock sensors and a valve of a high pressure gas vessel is opened by gunpowder usually to supply high pressure gas into the folded air bag for air bag expansion. That is, the air bag apparatus is usually composed of an air bag, a gas generator, a gas ignitor, shock sensors, etc.

To facilitate understanding of the present invention, collision mode will be first explained. In general, vehicle collision can be classified into either a slight collision or a serious (pole) collision. The slight collision is a collision mode in which an air bag is not required to be expanded as when a vehicle travelling at a relatively low speed collides head-on against a wall, for instance. In this slight collision mode, strong members provided within an engine room will not be deformed to absorb a shock, and therefore a shock applied to a bumper is transmitted to a vehicle room without time delay, with a result that deceleration sensors arranged within a vehicle room output detection signals, respectively each of whose detection signal levels increases uniformly in waveform shape. On the other hand, the serious (pole) collision is a collision mode in which an air bag is required to be expanded as when a vehicle collides against a pole-like obstruction, for instance. In this serious collision mode, the strong members provided within the engine room are first deformed to absorb shock and thereafter a secondary shock due to engine movement is applied to the vehicle room. In this mode, therefore, a shock applied to the bumper is transmitted to the vehicle room without time delay and thereafter another shock is applied to the vehicle room; with a result that deceleration sensors arranged within the vehicle room output detection signals, respectively each of whose detection signal levels increases uniformly in waveform shape for a while after collision but increases sharply after a predetermined time has elapsed. However, under some conditions there exists a problem in that the waveform of the sensor output signal at the serious collision is similar to that at the slight collision within a predetermined time after collision, as when the vehicle collides obliquely against a wall.

To overcome the above-mentioned problem in the prior-art air bag ignition control apparatus as disclosed in Japanese Published Unexamined (Kokai) Patent Appli. No. 55-19627 or Japanese Published Unexamined (Kokai) Utility Model Appli. No. 55-47602, a plurality of deceleration sensors connected in parallel to each other are arranged at the bumper and within the vehicle room, separately, so that an ignition signal can be outputted to expand the air bag whenever any one of the deceleration sensors detects a deceleration rate beyond a predetermined value.

In the above-mentioned prior-art air bag ignition control apparatus, however, since a plurality of deceleration sensors are required, there exists another problem in that the parts and the assembly cost are both relatively high.

SUMMARY OF THE INVENTION

With these problems in mind, therefore, it is the primary object of the present invention to provide an air bag ignition control system for an automotive vehicle which can output an air bag ignition signal reliably on the basis of a shock detection signal outputted from a single deceleration sensor mounted on a vehicle body or provided within a vehicle room.

To achieve the above-mentioned object, the air bag ignition control system for an automotive vehicle, according to the present invention, comprises: (a) single deceleration sensing means (3) for sensing vehicle deceleration due to collision and generating a deceleration detection signal (G); (b) speed information calculating means (101) responsive to said deceleration sensing means, for calculating a speed information value (B) on the basis of the deceleration detection signal; (c) collision mode information calculating means (102) responsive to said deceleration sensing means, for calculating a collision mode information value (E) on the basis of the deceleration detection signal; and (d) ignition signal generating means (103) responsive to said speed information calculating means and said collision mode information calculating means, for calculating an ignition decision information value (F) on the basis of the calculated speed information value (B) and collision mode information value (E) and generating an air bag ignition signal when the calculated ignition decision information value (F) exceeds a predetermined value (K).

In the first embodiment, the method of controlling air bag ignition, according to the present invention, comprises the following steps of: (a) detecting vehicle deceleration due to collision and generating a deceleration detection signal (G); (b) selecting low-frequency components ($G_1$) of the decelerated detection signal (G); (c) calculating an accumulative speed information value B in accordance with the following formula:

$$B \leftarrow B + \int G_1\, dt$$

where $\int G_1\, dt$ denotes a low-frequency deceleration detection signal level integrated within a predetermined calculation period (J) (the arrow and throughout this application indicates a substitution, e.g., A←A+B indicates that A+B is substituted for A.); (d) calculating an accumulative collision mode information value (E) in accordance with the following formula:

$$E \leftarrow E + (G_{1(max)} - G_{1(min)})$$

where $G_{1(max)}$ denotes a maximum low-frequency deceleration detection signal level and $G_{1(min)}$ denotes a minimum low-frequency deceleration detection signal level both obtained within a predetermined sampling period (TS); (e) calculating an ignition decision information value F in accordance with the following formula:

$$F \leftarrow B + H \times E$$

where H denotes a predetermined coefficient; and (f) generating an air bag ignition signal when the ignition decision information value (F) exceeds a predetermined value (K).

In the second embodiment, the method of controlling air bag ignition, according to the present invention, comprises the following steps of: (a) detecting vehicle deceleration due to collision and generating a deceleration detection signal (G); (b) selecting low-frequency components ($G_1$) of the decelerated detection signal (G); (c) selecting medium-frequency components ($G_2$) of the decelerated detection signal (G); (d) calculating an accumulative speed information value B in accordance with the following formula:

$$B \leftarrow B + \int G_1 \, dt$$

(e) calculating an accumulative collision mode information value (E) in accordance with the following formula:

$$E \leftarrow E + (G_{2(max)} - G_{2(min)})$$

where $G_{2(max)}$ denotes a maximum medium-frequency deceleration detection signal level and $G_{2(min)}$ denotes a minimum medium-frequency deceleration detection signal level both obtained within a predetermined sampling period (TS); (f) calculating an ignition decision information value F in accordance with the following formula:

$$F \leftarrow B + H \times E$$

and (g) generating an air bag ignition signal when the ignition decision information value (F) exceeds a predetermined value (K).

In the third embodiment, the method of controlling air bag ignition, according to the present invention, comprises the following steps of: (a) detecting vehicle deceleration due to collision and generating a deceleration detection signal (G); (b) selecting low-frequency components ($G_1$) of the decelerated detection signal (G); (c) selecting medium-frequency components ($G_2$) of the decelerated detection signal (G); (d) calculating an accumulative speed information value B in accordance with the following formula:

$$B \leftarrow B + \int G_1 \, dt$$

(e) calculating an accumulative collision mode information value N in accordance with the following formula:

$$N \leftarrow N + \int G_2 \, dt$$

where $\int G_2 \, dt$ denotes a medium-frequency deceleration detection signal level integrated within a predetermined calculation period (J); (f) calculating an ignition decision information value F in accordance with the following formula:

$$F \leftarrow B + H \times N$$

and (g) generating an air bag ignition signal when the ignition decision information value (F) exceeds a predetermined value (K).

In the air bag ignition control system for an automotive vehicle and the method therefor according to the present invention, since an air bag ignition decision signal can be generated on the basis of an ignition decision information value (F) determined on the basis of a speed information value (B) and a collision mode information value (E) both calculated by a deceleration detection signal, it is possible to reliably distinguish slight collision from serious collision or vice versa using only a single deceleration sensor disposed within a vehicle room, for instance, thus reducing the necessary components and assembly cost thereof.

Further, since the system can be mainly configured by low- and/or band-pass filter and a CPU, it is possible to simplify the system configuration, because the CPU can be used in common to control other vehicle control systems.

DETAILED DESCRIPTION OF THE PREFERRED EMBODIMENTS

Embodiments of the air bag ignition control system according to the present invention will be described hereinbelow with reference to the attached drawings.

Figure 1:
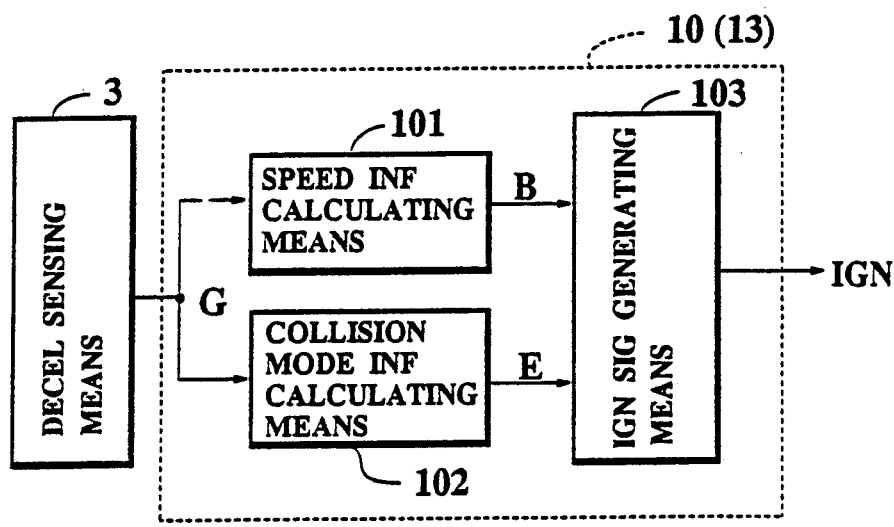
FIG. 1 is a conceptual block diagram showing a basic system configuration of the present invention.

FIG. 1 shows a conceptual system configuration of the embodiments according to the present invention, in which the system comprises deceleration sensing means 3 disposed within a vehicle room to detect a deceleration of a vehicle after collision and a controller 10 including vehicle speed information calculating means 101 for calculating vehicle-speed related information value in response to a deceleration detection signal outputted from the deceleration sensing means 3; collision mode information calculating means 102 for calculating collision-mode related information value in response to a deceleration detection signal outputted from the deceleration sensing means 3; and ignition signal generating means 103 for deciding whether an air bag ignition signal is required to be outputted or not in response to the calculated vehicle speed information value and the calculated collision mode information value.

In summary, a deceleration detection signal G is detected by the deceleration sensing means 3; a speed information value B is calculated on the basis of the deceleration detection signal G by the speed information calculating means 101; a collision mode information value E is calculated on the basis of the deceleration detection signal G by the collision mode information calculating means 102; an ignition decision information value F is calculated on the basis of the calculated speed information value B and collision mode information value E, and an air bag ignition signal IGN is generated by the ignition signal generating means 103, when the ignition decision information value F exceeds a predetermined value, to expand an air bag.

Figure 2:
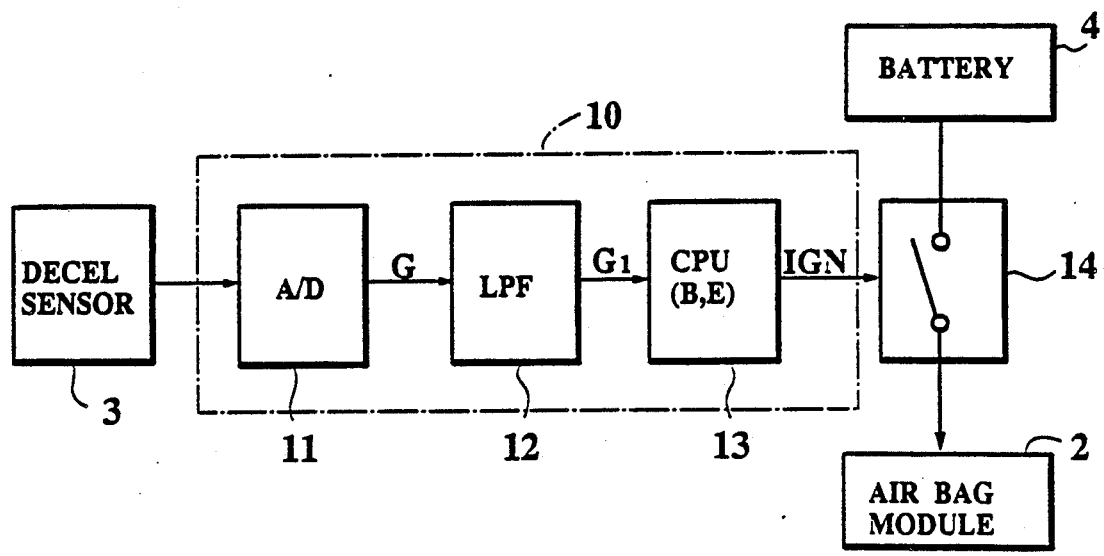
FIG. 2 is a block diagram showing a practical controller of the system according to the present invention.

FIG. 2 shows a practical controller 10 of the system according to the present invention, which comprises an A/D converter 11 for converting an analog detection signal from the deceleration sensor 3 to a digital detection signal; a low-pass filter 12 for passing only low-frequency components of the digital deceleration detection signal; a CPU 13 for executing necessary arithmetic processing (described later in detail) on the basis of the low-frequency deceleration detection signal; and a switching element (e.g. transistor) 14 turned on in response to an air bag ignition signal IGN from the CPU 13, to supply power from a battery 4 to an air bag module 2 for expanding the air bag module 2. Further, the CPU 13 constitutes the speed information calculating means 101, the collision mode information calculating means 102, and the ignition signal generating means 103.

Figure 3:
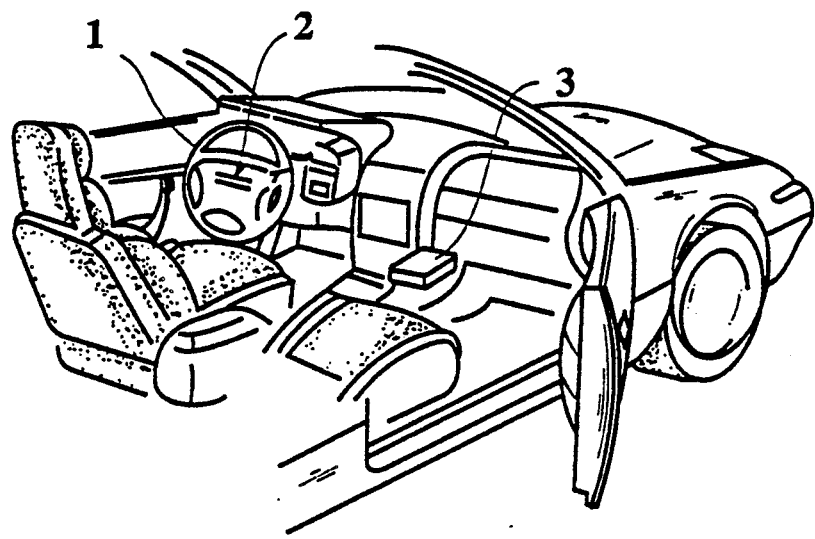
FIG. 3 is a perspective view showing an air bag module and a deceleration sensor arranged within a vehicle room.
Figure 4:
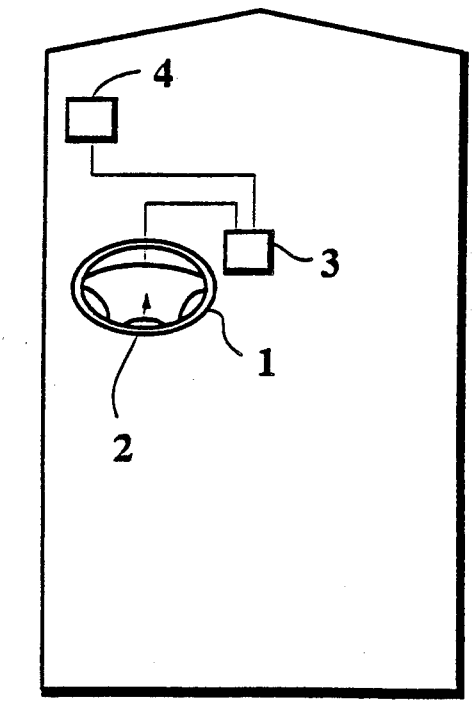
FIG. 4 is a plane view of the arrangement shown in FIG. 3.

FIGS. 3 and 4 show the actual arrangement of the system components, in which the air bag module 2 is disposed at roughly the center of a steering wheel 1; the deceleration sensor 3 is disposed at roughly a middle position of the vehicle room; and the battery 4 is disposed within an engine room. Further, the controller 10 or the CPU 13 can be used in common with that for controlling various vehicle operations.

Figure 5:
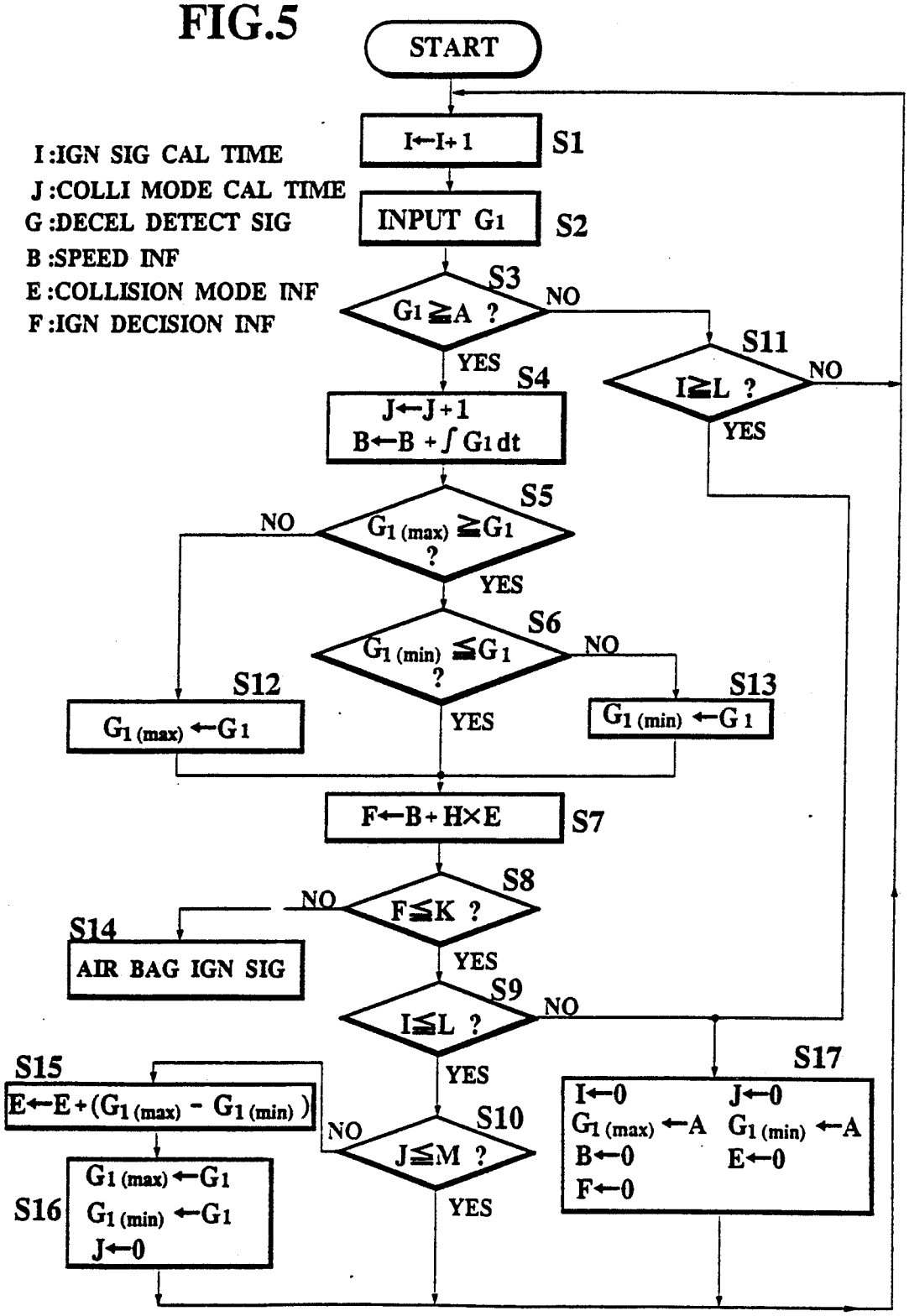
FIG. 5 is a flowchart for assistance in explaining the operation of the first embodiment according to the present invention.

The operation of the CPU 13 of the controller 10 in a first embodiment of the system according to the present invention will be described hereinbelow with reference to a flowchart shown in FIG. 5.

Control first increments an air bag ignition signal calculation time period I as a new time period I+1 (in step S1). This air bag ignition signal calculation time period I (e.g. 100 to 150 ms) is determined under due consideration of an optimum ignition timing point $t_r$ (shown in FIG. 6) after collision at which the air bag is to be expanded. Control inputs a digital deceleration detection signal (referred to as detection signal, hereinafter) $G_1$ through the low pass filter 12 (in step S2) and compares the detection signal $G_1$ with a predetermined threshold A to determine whether the signal level of $G_1$ is equal to or higher than A (in step S3).

If YES (in step S3), control proceeds to the succeeding step to increment a collision mode calculation time period J as a new time period J+1 and further calculate an accumulative vehicle speed information value B in accordance with the following formula (in step S4):

$$B \leftarrow B + \int G_1 \, dt \qquad (1)$$

where $\int G_1 \, dt$ denotes a low-frequency deceleration detection signal level integrated within a predetermined calculation period (J).

Subsequently, control checks whether $G_1$ is equal to or less than a maximum detection signal $G_{1(max)}$ in signal level (in step S5). If YES (in step S5), control checks whether $G_1$ is equal to or more than a minimum detection signal $G_{1(min)}$ in signal level (in step S6). If NO (in step S5); that is, if $G_{1(max)} < G_1$, control stores $G_1$ as a new $G_{1(max)}$ (in step S12). If NO (in step S6); that is, if $G_{1(min)} > G_1$, control stores $G_1$ as a new $G_{1(min)}$ (in step S13).

Subsequently, control calculates an ignition decision information value F in accordance with the following formula (in step S7):

$$F \leftarrow B + H \times E \qquad (2)$$

where B denotes the accumulative speed information value obtained in accordance with the formula (1); H denotes a coefficient; and E denotes an accumulative collision mode information value obtained in accordance with the formula (3) (described later in detail).

Thereafter, control proceeds to the succeeding step to check whether the ignition decision information value F is equal to or less than a threshold K (in step S8). If YES (in step S8), control proceeds to the succeeding step to further check whether the ignition signal calculation time period I is equal to or less than a reference value L (in step S9). If YES (in step S9), control proceeds to the succeeding step to further check whether the collision mode calculation time period J is equal to or less than a threshold M (in step 10). If YES (in step S10), control returns to the step S1, repeating the above-mentioned procedure.

In the above-mentioned control procedure, if the ignition decision information value F is more than K (threshold) (in step S8), control outputs an air bag ignition signal (in step S14) to turn on the switching element 14 so that the battery 4 is connected to the air bag module 2 to expand the air bag module 2 for driver protection from shock.

Further, if the collision mode calculation time period J is longer than M (threshold) (in step S10), control proceeds to the succeeding step to obtain the collision mode information value E in accordance with the following formula (in step S15).

$$E \leftarrow E + (G_{1(max)} - G_{1(min)}) \qquad (3)$$

where $G_{1(max)}$ denotes a maximum low-frequency deceleration detection signal level and $G_{1(min)}$ denotes a minimum low-frequency deceleration detection signal level both obtained within a predetermined sampling period (TS) as shown in FIGS. 7(A) and (B).

Here, it is preferable to determine the collision mode calculation time period J according to the period during which $G_{1(max)}$ and $G_{1(min)}$ are repeated (e.g. several tens m sec), so that the above formula (3) can be executed as often as possible during the ignition signal calculating period I (e.g. 100 to 150 m sec) for providing a higher calculation accuracy.

Further, control proceeds to the succeeding steps to set the new deceleration detection signal $G_1$ inputted (in step S2) as $G_{1(max)} \leftarrow G_1$; $G_{1(min)} \leftarrow G_1$; and J←0 (in step S16), returning to step S1.

Further, if $G_1$ is less than A (in step S3), control proceeds to the succeeding step to check whether the ignition signal calculation time period I is equal to or longer than the reference value L (in step S11). If NO (in step S11), control returns to step 1. If YES (in step S11), control proceeds to the succeeding step to reset the ignition signal calculation time period I, the collision mode calculation time period J, the vehicle speed information value B, the collision mode information value E, and the ignition decision information value F and to set the threshold A determined (in step S3) as $G_{1(max)} \leftarrow A$ and $G_{1(min)} \leftarrow A$ (in step S17) returning to step S1. Further, when I (ignition signal calculation time period) is longer than L (reference value) (in step S9), control proceeds to the step S17.

The operation of the air bag control system will be described in further detail with reference to FIGS. 6 to 8.

Figure 6:
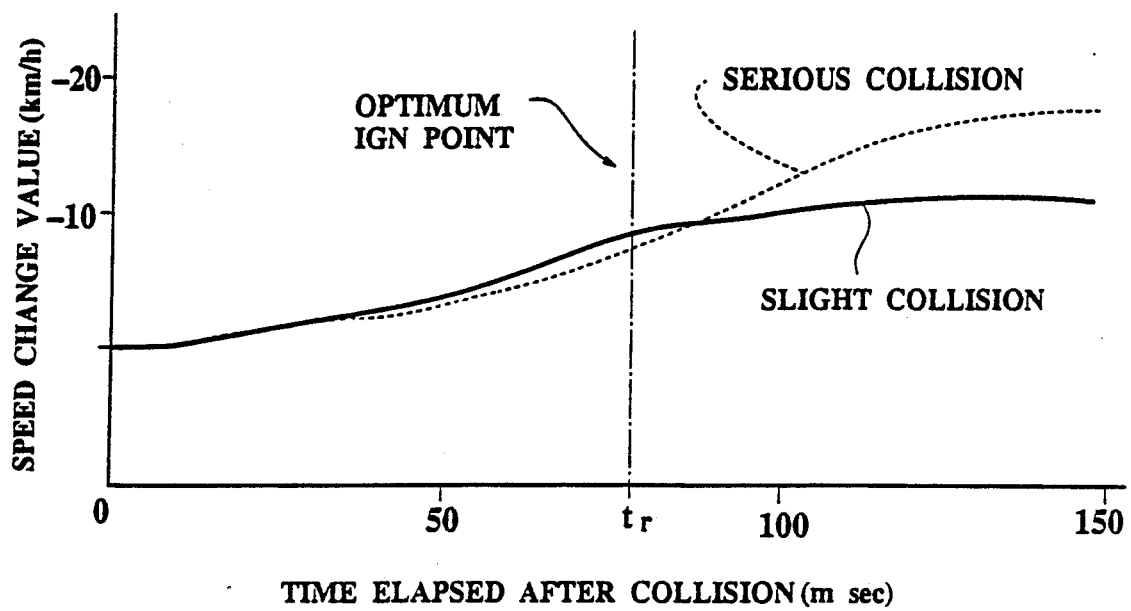
FIG. 6 is a graphical representation showing vehicle speed change value with the lapse of time after collision.
Figure 7:
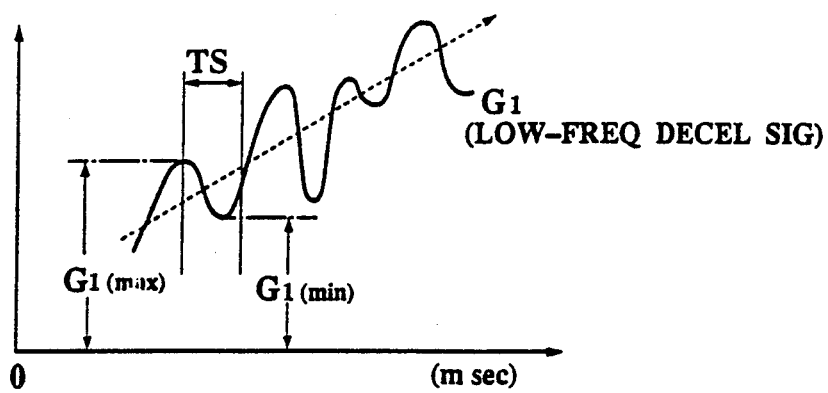
FIG. 7(A) is a graphical representation showing a waveform of low-frequency components ($G_1$) of the deceleration detection signal.
FIG. 7(B) is a similar graphical representation showing a waveform of medium-frequency components ($G_2$) of the deceleration detection signal.
Figure 7:
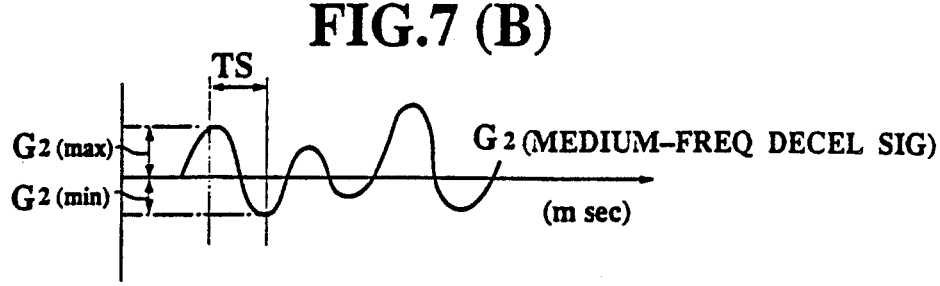

FIG. 6 shows the vehicle speed change value (i.e. speed information) (km/h) at slight collision by a solid line and that at serious collision by a dashed line. In FIG. 6, a vertical line $t_r$ is an optimum ignition timing point at which the air bag is to be expanded after collision. FIG. 6 indicates that it is impossible to discriminate the slight collision from the serious collision or vice versa because the speed change value are similar to each other between O and $t_r$ (m sec).

To overcome this problem, according to the present invention, the low-frequency deceleration detection signal $G_1$ varying as shown in FIG. 7(A) is integrated within a predetermined sampling period TS (e.g. 10 m sec) to obtain $B = \int G_1 \, dt$ and further an accumulative vehicle speed information value as $B \leftarrow B + \int G_1 \, dt$ in step S4. In addition, a difference in speed change value between the maximum value $G_{1(max)}$ and the minimum value $G_{1(min)}$ of the low-frequency deceleration detection signal $G_1$ as shown in FIG. 7(A) is obtained within a predetermined sampling time TS (e.g. M×J, where J denotes an ignition signal calculation increment time and M denotes an integer) to obtain $G_{1(max)} - G_{1(min)}$ and further an accumulative collision mode information value as $E \leftarrow E + (G_{1(max)}) - G_{1(min)})$ in step S15.

Further, an ignition decision information value F can be obtained by adding the vehicle speed information value B to the collision mode information value E multiplied by a coefficient H as $F \leftarrow B + H \times E$ in step S7. An air bag ignition signal is outputted when this ignition decision information value F exceeds a reference threshold value K (in step S14).

Figure 8:
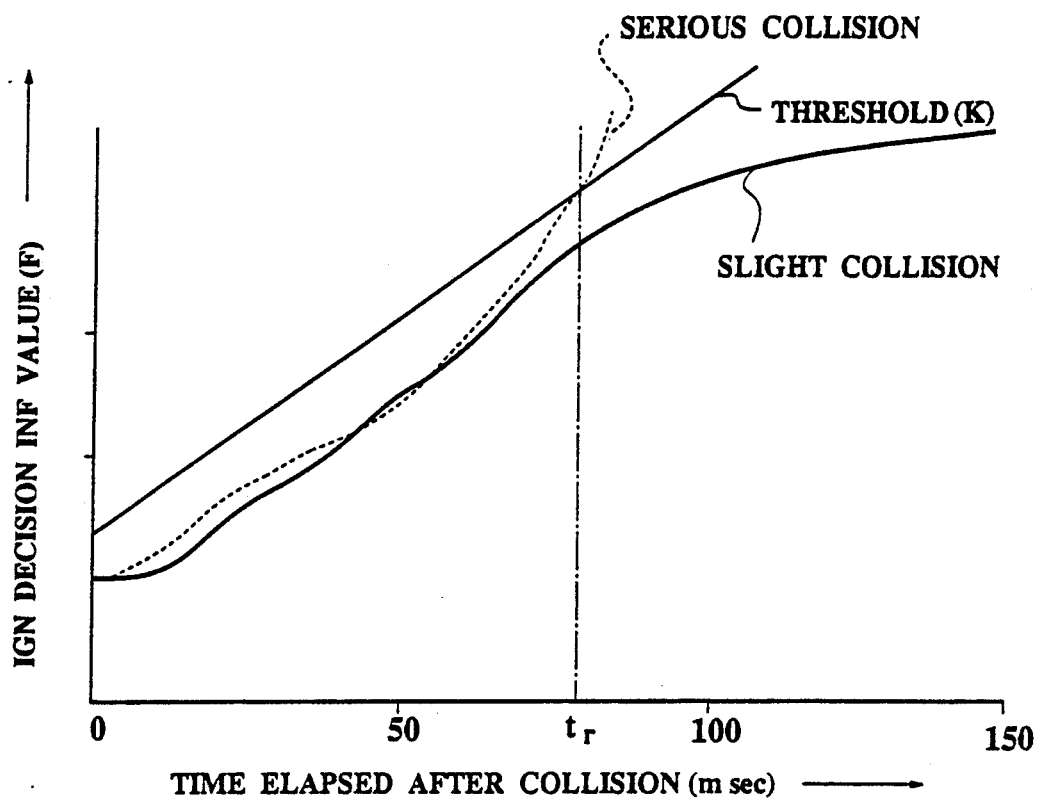
FIG. 8 is a graphical representation showing ignition decision information value F with the lapse of time after collision according to the present invention.

FIG. 8 shows the ignition decision information value F which increases with increasing elapse of time after collision. FIG. 8 indicates that the ignition decision information value F at serious collision increases sharply as the time has elapsed after collision and then reaches the optimum ignition timing point $t_r$. However, the value F at slight collision increases roughly uniformly through the optimum ignition timing point $t_r$ as the time has elapsed after collision. In other words, the ignition decision information value F at serious collision exceeds the threshold K near the optimum ignition timing point $t_r$; however, that at slight collision will not exceeds the threshold K, so that it is possible to securely distinguish the two different collisions from each other by a single deceleration sensor.

Figure 9:
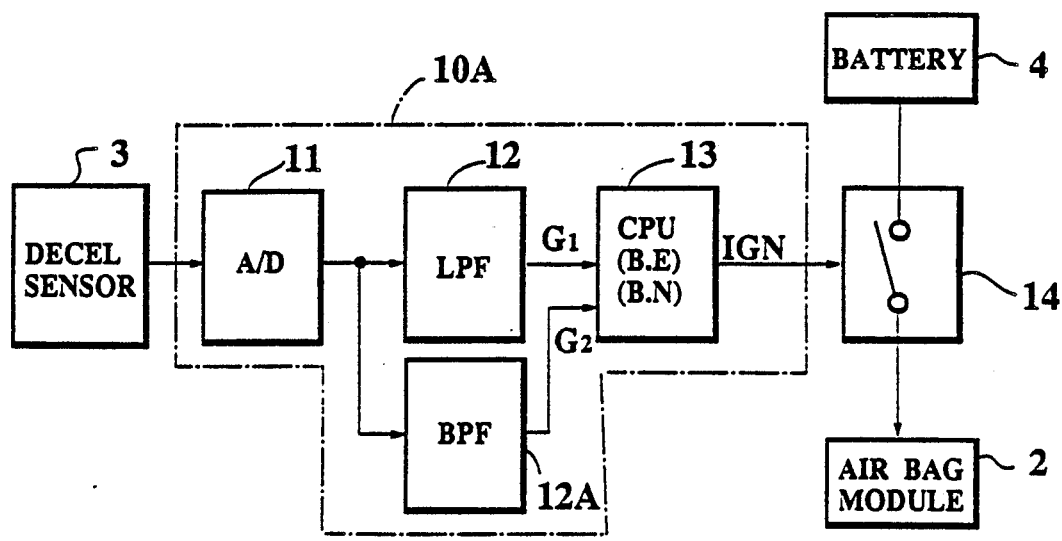
FIG. 9 is a block diagram showing second and third embodiments of the present invention.

FIG. 9 shows a practical controller 10A of second and third embodiments of the system according to the present invention, in which a band-pass filter 12A is additionally connected between the A/D converter 11 and the CPU 13, in order to separate medium frequency components of the digital deceleration detection signal $G_2$ from the digital detection signal G, in addition to the low-pass filter 12. The ignition decision information value F is obtained on the basis of these two deceleration detection signals $G_1$ and $G_2$ in the second and third embodiments.

Figure 10:
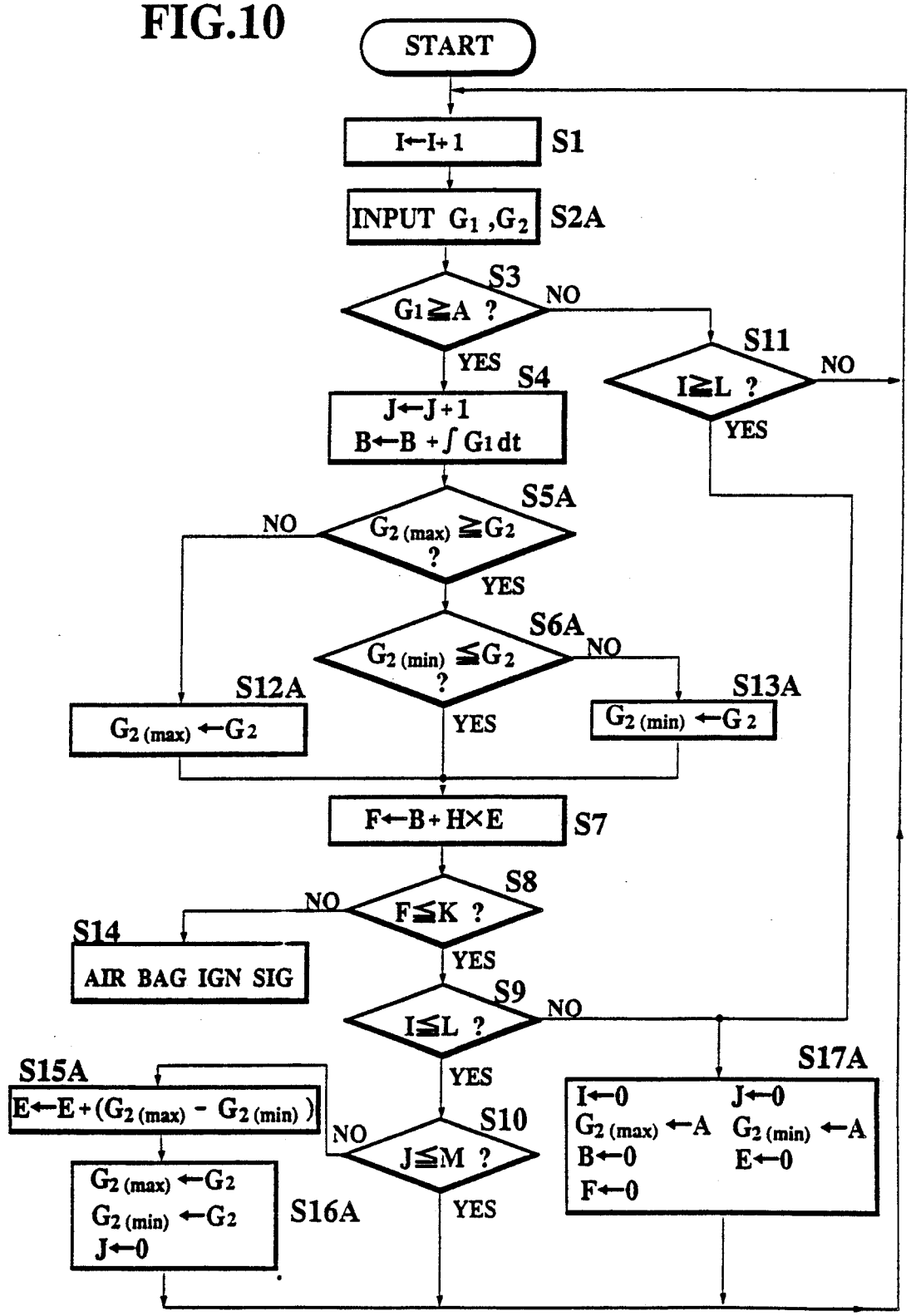
FIG. 10 is a flowchart for assistance in explaining the operation of the second embodiment.

The operation of the second embodiment will be described in more detail with reference to a flowchart shown in FIG. 10. In FIG. 10, being different from the first embodiment shown in FIG. 5, the accumulative collision mode information value E is calculated on the basis of $G_{2(max)}$ and $G_{2(min)}$ of the medium-frequency detection signal. This is because the medium-frequency detection signal $G_2$ includes almost no low-frequency components of vehicle speed change, so that it is possible to more accurately distinguish the slight collision from the serious collision or vice versa without being subjected to the influence of vehicle speed change. In addition, since the digital detection signal is divided into the low-frequency detection signal $G_1$ and the medium-frequency detection signal $G_2$, it is possible to more easily adjust the optimum ignition timing point $t_r$ (shown in FIG. 8) by appropriately determining the coefficient H in formula (2).

With reference to FIG. 10, control inputs both the low-frequency detection signal $G_1$ and the medium-frequency detection signal $G_2$ (in step S2A), and checks whether $G_2$ is equal to or less than $G_{2(max)}$ (in step S5A). If YES (in step S5A), control further checks whether $G_2$ is equal to or more than $G_{2(min)}$ (in step S6A). If NO or in other words if $G_{2(max)} < G_2$ (in step S5A), control stores $G_2$ as $G_{2(max)} \leftarrow G_2$ (in step 12A), and if NO or $G_{2(min)} > G_2$ (in step S13A), control stores $G_2$ as $G_{2(min)} \leftarrow G_2$ (in step 13A). Therefore, control calculates the accumulative collision mode information value E in accordance with the following formula (in step S15A):

$$E \leftarrow E + (G_{2(max)} - G_{2(min)}) \tag{3A}$$

where $G_{2(max)}$ denotes a maximum medium frequency deceleration detection signal level and $G_{2(min)}$ denotes a minimum medium-frequency deceleration detection signal level both determined within a predetermined sampling period TS.

Further, control sets the new detection signal $G_2$ as $G_{2(max)} \leftarrow G_2$; $G_{2(min)} \leftarrow G_2$; and $J \leftarrow O$ (in step S16A) and sets the threshold A as $G_{2(max)} \leftarrow A$ and $G_{2(min)} \leftarrow A$ (in step S17A).

In this second embodiment, the accumulative vehicle speed information value B is obtained on the basis of the low-frequency detection signal $G_1$ in accordance with the formula (1) (in step S4) in the same way as in the first embodiment; however, the accumulative collision mode information value E during the sampling period TS is obtained on the basis of the medium-frequency detection signal $G_2$ in accordance with the formula (3) (in step S15A) being different from the first embodiment. Further, the ignition decision information value F is obtained in accordance with the formula (2) (in step S7), and an ignition signal is generated when F exceeds the threshold K (in step S14) in the same way as in the first embodiment.

Figure 11:
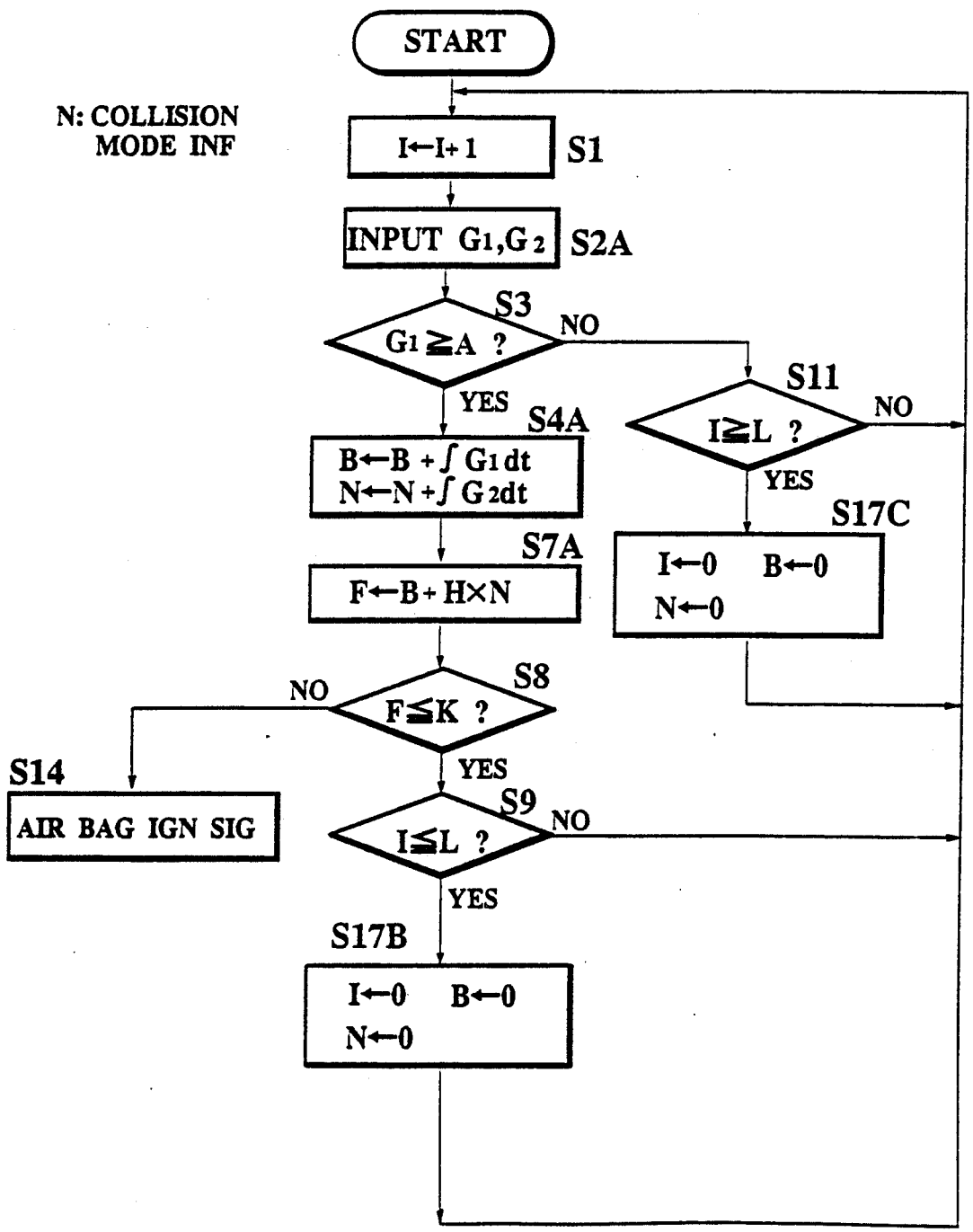
FIG. 11 is a flowchart for assistance in explaining the operation of the third embodiment.

The operation of the third embodiment will be described in detail with reference to a flowchart shown in FIG. 11. In FIG. 11, being different from the first and second embodiments shown in FIGS. 5 and 10, the collision mode information value N is calculated on the basis of the medium frequency detection signal $G_2$. This is because the collision mode information value N can be obtained continuously, in contrast with the first and second embodiments where the similar value E is obtained discontinuously on the basis of differences between $G_{1(max)}$ and $G_{1(min)}$ or $G_{2(max)}$ and $G_{2(min)}$, thus allowing the optimum ignition timing point $t_r$ to be more finely adjustable. Further, it is also possible to increase the calculation speed, because the collision mode information value N can be calculated continuously.

With reference to FIG. 11, control inputs both the low-frequency detection signal $G_1$ and the medium frequency detection signal $G_2$ (in step S2A). Control calculates the accumulative speed information value B in accordance with the formula (1) and the collision mode information value N in accordance with the following formula (in step 4A):

$$N \leftarrow N + \int G_2 \, dt \qquad (4)$$

where $\int G_2 \, dt$ denotes a medium frequency deceleration detection signal level integrated within a predetermined calculates period J.

Subsequently, control calculate the ignition decision information value F in accordance with the following formula (in step S7A):

$$F \leftarrow B + H \times N \qquad (5)$$

where H denotes a coefficient.

Further, control determines whether the ignition signal calculation time period I is equal to or longer than the reference value L (in step S11) or equal to or shorter than the reference value L (in step S9), control resets the time period I, the speed information value B and the collision mode information value N (in steps S17B and S17C), returning to the step S1. In this third embodiment, it is possible to calculate the collision mode information value N almost equivalent to that of E obtained in the second embodiment (in step S15A) as $$E \leftarrow E + (G_{2(max)} + G_{2(min)}).$$

As described above, in the air bag ignition control system according to the present invention, since the slight collision and the serious collision can be reliably distinguishable from each other by only a single deceleration sensor disposed within a vehicle room, it is possible to reduce the parts and assembly cost thereof. Further, since the system can be configured mainly by low-and/or band-pass filter and a CPU, the system configuration can be simplified markedly by use of the CPU in common with that used to control other vehicle control systems.

What is claimed is:

1. An air bag ignition control system for an automotive vehicle, comprising;
   (a) single deceleration sensing means for sensing vehicle deceleration due to collision and generating deceleration detection signals;
   (b) speed information calculating means responsive to said deceleration sensing means, for calculating a speed information value on the basis of accumulative low-frequency components of the deceleration detection signals;
   (c) collision mode information calculating means responsive to said deceleration sensing means, for calculating as collision mode information value on the basis of accumulative differences in signal level between the maximum and minimum low frequency components of the deceleration detection signals within a predetermined sampling period; and
   (d) ignition signal generating means responsive to said speed information calculating means and said collision mode information calculating means, for calculating an ignition decision information value on the basis of the calculated speed information value and collision mode information value and generating an air bag ignition signal when the calculated ignition decision information value exceeds a predetermined value.

2. The air bag ignition control system of claim 1, which further comprises low-pass filter means connected between said deceleration sensing means and said speed information calculating means, for selecting low-frequency components of the deceleration detection signal and, wherein said speed information calculating means calculates an accumulative speed information value B in accordance with the following formula:

$$B \leftarrow B + \int G_1 \, dt$$

where $\int G_1 \, dt$ denotes a low-frequency deceleration detection signal level integrated within a predetermined calculation period.

3. The air bag ignition control system of claim 2, wherein said collision mode information calculating means calculates an accumulative collision mode information value E in accordance with the following formula:

$$E \leftarrow E + (G_{1(max)} - G_{1(min)})$$

where $G_{1(max)}$ denotes a maximum low-frequency deceleration detection signal level and $G_{1(min)}$ denotes a minimum low-frequency deceleration detection signal level both obtained within a predetermined sampling period.

4. The air bag ignition control system of claim 3, wherein said ignition signal generating means calculates an ignition decision information value F in accordance with the following formula:

$$F \leftarrow B + H \times E$$

where H denotes a coefficient, said ignition signal generating means generating an air bag ignition signal when the ignition decision information value exceeds a predetermined value.

5. The air bag ignition control system of claim 1, which further comprises low-pass filter means connected between said deceleration sensing means and said speed information calculating means, for selecting low-frequency components of the deceleration detection signal and band-pass filter means connected between said deceleration sensing means and said collision mode information calculating means, for selecting medium-frequency components of the deceleration detection signal, and wherein said speed information calculating means calculates an accumulative speed information value B in accordance with the following formula:

$$B \leftarrow B + \int G_1 \, dt$$

where $\int G_1 \, dt$ denotes a low frequency deceleration detection signal level integrated within a predetermined calculation period.

6. The air bag ignition control system of claim 5, wherein said collision mode information calculating means calculates an accumulative collision mode information value E in accordance with the following formula:

$$E \leftarrow E + (G_{2(max)} - G_{2(min)})$$

where $G_{2(max)}$ denotes a maximum medium-frequency deceleration detection signal level and $G_{2(min)}$ denotes a minimum medium-frequency deceleration detection signal level both determined within a predetermined sampling period.

7. The air bag ignition control system of claim 6, wherein said ignition signal generating means calculates an ignition decision information value F in accordance with the following formula:

$$F \leftarrow B + H \times E$$

where H denotes a coefficient, said ignition signal generating means generating an air bag ignition signal when the ignition decision information value exceeds a predetermined value.

8. The air bag ignition control system of claim 1, which further comprises low-pass filter means connected between said deceleration sensing means and said speed information calculating means, for selecting low-frequency components of the deceleration detection signal and band-pass filter means connected between said deceleration sensing means and said collision mode information calculating means, for selecting medium frequency components of the deceleration detection signal, and wherein said speed information calculating means calculates an accumulative speed information value B in accordance with the following formula:

$$B \leftarrow B + \int G_1 \, dt$$

where $\int G_1 \, dt$ denotes a low-frequency deceleration detection signal level integrated within a predetermined calculation period.

9. The air bag ignition control system of claim 8, wherein said collision mode information calculating means calculates an accumulative collision mode information value N in accordance with the following formula:

$$N \leftarrow N + \int G_2 \, dt$$

where $\int G_2 \, dt$ denotes a medium-frequency deceleration detection signal level integrated within a predetermined calculation period.

10. The air bag ignition control system of claim 9, wherein said ignition signal generating means calculates an ignition decision information value F in accordance with the following formula:

$$F \leftarrow B + H \times N$$

where H denotes a coefficient, said ignition signal generating means generating an air bag ignition signal when the ignition decision information value exceeds a predetermined value.

11. A method of controlling air bag ignition which comprises the following steps of:
(a) detecting vehicle deceleration due to collision and generating a deceleration detection signal;
(b) selecting low-frequency components of the decelerated detection signal;
(c) calculating an accumulative speed information value B in accordance with the following formula:

$$B \leftarrow B + \int G_1 \, dt$$

where $\int G_1 \, dt$ denotes a low-frequency deceleration detection signal level integrated within a predetermined calculation period;
(d) calculating an accumulative collision mode information value E in accordance with the following formula:

$$E \leftarrow E + (G_{1(max)} - G_{1(min)})$$

where $G_{1(max)}$ denotes a maximum low frequency deceleration detection signal level and $G_{1(min)}$ denotes a minimum low-frequency deceleration detection signal level both obtained within a predetermined sampling period;
(e) calculating an ignition decision information value F in accordance with the following formula:

$$F \leftarrow B + H \times E$$

where H denotes a predetermined coefficient; and
(f) generating an air bag ignition signal when the ignition decision information value exceeds a predetermined value.

12. A method of controlling air bag ignition which comprises the following steps of:
(a) detecting vehicle deceleration due to collision and generating a deceleration detection signal;
(b) selecting low-frequency components of the decelerated detection signal;
(c) selecting medium-frequency components of the decelerated detection signal;
(d) calculating an accumulative speed information value B in accordance with the following formula:

$$B \leftarrow B + \int G_1 \, dt$$

where $\int G_1 \, dt$ denotes a low-frequency deceleration detection signal level integrated within a predetermined calculation period;
(e) calculating an accumulative collision mode information value E in accordance with the following formula:

$$E \leftarrow E + (G_{2(max)} - G_{2(min)})$$

where $G_{2(max)}$ denotes a maximum medium-frequency deceleration detection signal level and $G_{2(min)}$ denotes a minimum medium-frequency deceleration detection signal level both obtained within a predetermined sampling period;
(f) calculating an ignition decision information value F in accordance with the following formula:

$$F \leftarrow B + H \times E$$

where H denotes a predetermined coefficient; and
(g) generating an air bag ignition signal when the ignition decision information value exceeds a predetermined value.

13. A method of controlling air bag ignition which comprises the following steps of:

(a) detecting vehicle deceleration due to collision and generating a deceleration detection signal;

(b) selecting low-frequency components of the decelerated detection signal;

(c) selecting medium-frequency components of the decelerated detection signal;

(d) calculating an accumulative speed information value B in accordance with the following formula:

$$B \leftarrow B + \int G_1 \, dt$$

where $\int G_1 \, dt$ denotes a low-frequency deceleration detection signal level integrated within a predetermined calculation period;

(e) calculating an accumulative collision mode information value N in accordance with the following formula:

$$N \leftarrow N + \int G_2 \, dt$$

where $\int G_2 \, dt$ denotes a medium-frequency deceleration detection signal level integrated within a predetermined calculation period;

(f) calculating an ignition decision information value F in accordance with the following formula:

$$F \leftarrow B + H \times N$$

where H denotes a predetermined coefficient; and (g) generating an air bag ignition signal when the ignition decision information value exceeds a predetermined value.

* * * * *